United States Patent [19]

Tsuda et al.

[11] Patent Number: 5,435,685
[45] Date of Patent: Jul. 25, 1995

[54] STORAGE AND DELIVERY DEVICE FOR PACKED FOODS

[75] Inventors: Kiichiro Tsuda, Kanagawa; Seiitsu Kin, Tokyo; Toru Kajimura, Mie, all of Japan

[73] Assignee: Fuji Electric Co., Ltd., Kawasaki, Japan

[21] Appl. No.: 231,639

[22] Filed: Apr. 22, 1994

[30] Foreign Application Priority Data

Apr. 26, 1993 [JP] Japan ................................. 5-098243

[51] Int. Cl.⁶ ............................................. B65G 1/00
[52] U.S. Cl. ..................................... 414/331; 414/223
[58] Field of Search ............... 414/223, 226, 237, 331; 312/36, 42, 97.1, 202, 402.3

[56] References Cited

U.S. PATENT DOCUMENTS

| | | | |
|---|---|---|---|
| 3,061,393 | 10/1962 | Hileman | 312/36 X |
| 3,860,130 | 1/1975 | Frangos | 414/237 |
| 4,561,820 | 12/1985 | Matheny, III et al. | 414/331 |
| 4,651,863 | 3/1987 | Reuter et al. | 414/223 X |
| 4,655,676 | 4/1987 | Jannborg et al. | 414/226 X |
| 4,928,502 | 5/1990 | Kumada et al. | 62/440 |
| 4,998,857 | 3/1991 | Paravella et al. | 414/331 |
| 5,018,927 | 5/1991 | Tanaka | 414/331 |
| 5,029,447 | 7/1991 | Richard | 62/63 |
| 5,221,023 | 6/1993 | Dubik | 221/87 X |
| 5,233,844 | 8/1993 | Krippscheer et al. | 414/331 X |
| 5,305,615 | 4/1994 | McFadden et al. | 414/331 X |

FOREIGN PATENT DOCUMENTS

1044558 9/1983 U.S.S.R. .............................. 414/266

*Primary Examiner*—David M. Mitchell
*Assistant Examiner*—James W. Keenan
*Attorney, Agent, or Firm*—Kanesaka & Takeuchi

[57] ABSTRACT

A storage and delivery device for packed foods retained in containers is formed of a plurality of shelf cases each having a plurality of vertically oriented shelves for retaining the containers thereon, a storage shed for retaining the shelf cases therein and having a cyclic-moving device for cyclically moving the shelf cases horizontally along a horizontal closed loop, a processing device for processing the packed foods in the containers, and a robot. When an order is received, the robot takes out the container from the shelf of the shelf case and transfers the container to the processing device for processing the packed food. A storage room retains the storage shed, the processing device and the robot. The containers with the foods can be stored and automatically delivered after processing.

9 Claims, 6 Drawing Sheets

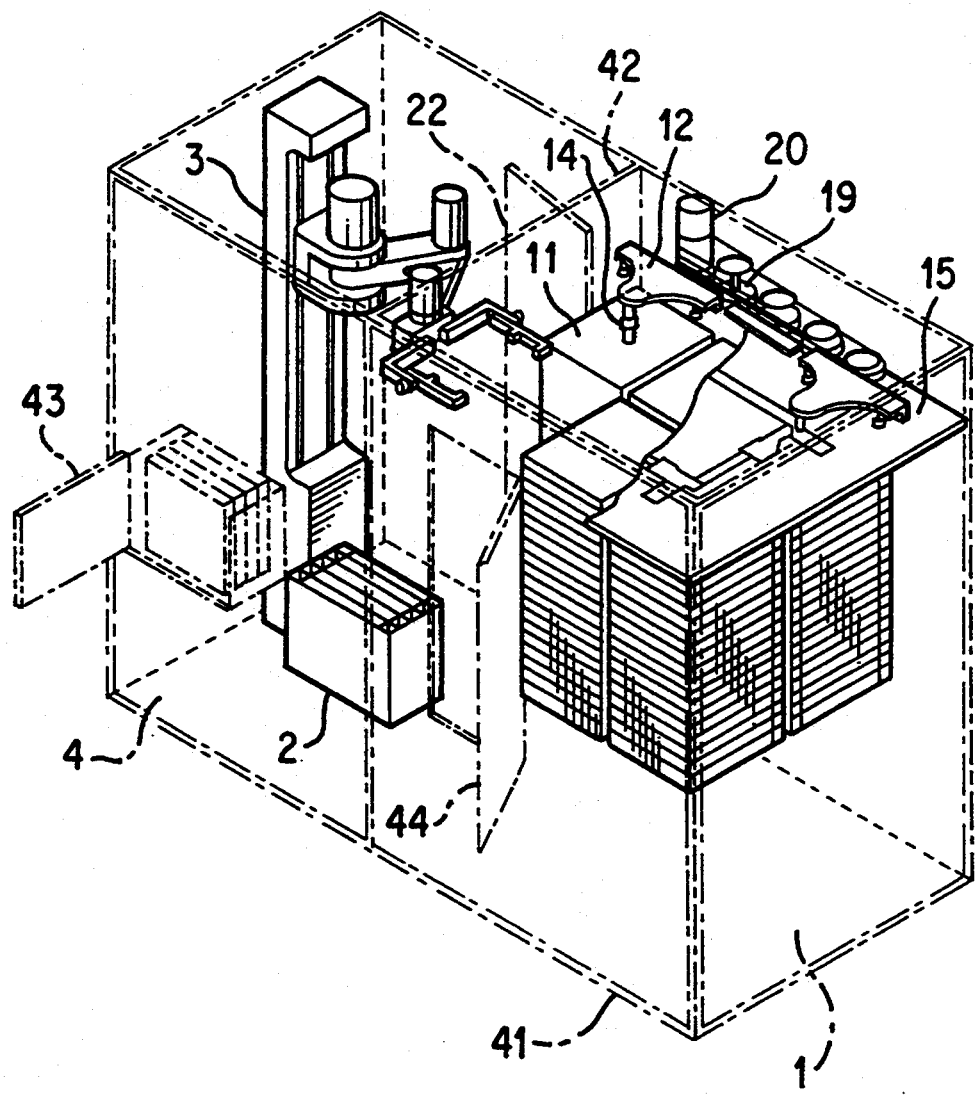
F I G. 1

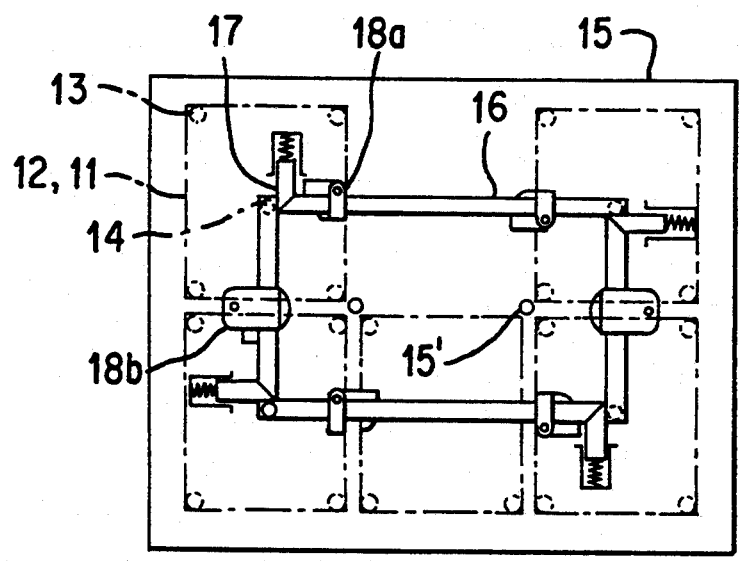
F I G. 4
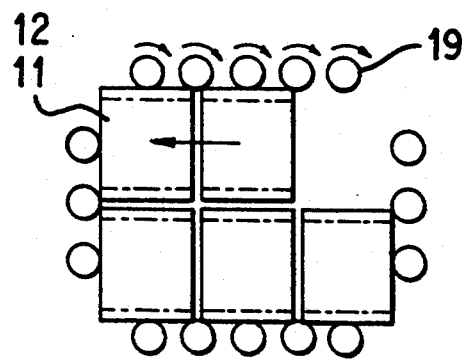
F I G. 5a
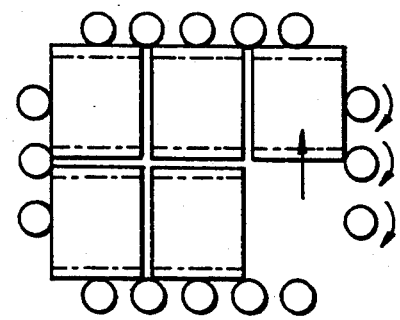
F I G. 5b
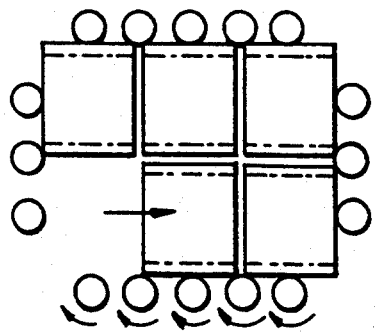
F I G. 5c
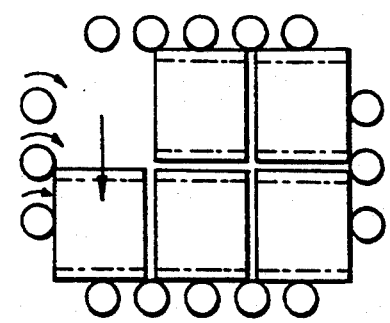
F I G. 5d

STORAGE AND DELIVERY DEVICE FOR PACKED FOODS

BACKGROUND OF THE INVENTION AND RELATED ART STATEMENT

The present invention relates to a storage and delivery device for packed foods retained in containers with predetermined shapes so that a robot can easily handle the packed foods. The packed foods in the containers are placed and housed in multiple shelves, and stored in a refrigerated condition, and upon request, the containers with the packed foods are taken out from the shelves by the robot and delivered therefrom after defrosting or boiling the containers.

In recent years, fast-food restaurants have stored packed foods in a refrigerated condition, and at a meal time, the packed food is taken out individually upon customer's order and is delivered after being defrosted or boiled. The delivery of the foods was made manually.

Conventional methods for delivering the packed foods cause various problems:

(1) Basically, it is preferable to automatically deliver the stored foods. However, it is technically very difficult to automatically handle the packed foods because the forms or shapes of the packed foods are not constant and change easily.

(2) Since the customer may often wait for a long time, the time required to deliver the packed foods should be reduced.

(3) The packed foods are not stored efficiently, and it is difficult to apply the principle of using the foods in the stored order.

It is the object of the invention to provide a storage and delivery device for packed foods, wherein the packed foods are stored, automatically taken out based on the order, and are delivered after necessary processing. Especially, in the device, the packed foods are stored efficiently, and are delivered smoothly from shelves according to the principle of using the foods in the stored order to thereby reduce time required to deliver the packed foods.

SUMMARY OF THE INVENTION

In a first aspect of the invention, the storage and delivery device for packed foods is formed of a plurality of shelf cases for housing containers for packed foods, the containers being vertically piled in the respective shelf cases; a storage shed for retaining the shelf cases and having cyclic-moving means to cyclically move the shelf cases along a horizontal closed loop; a processing device for processing the packed foods stored in the containers; a robot which, based on the instructions, opens a door of the storage shed, takes out the container with the packed food from the shelf case to transfer to the processing device, and transfers the container after the packed food is processed at the processing device to a delivery port; and a storage room for storing the storage shed, the processing device and the robot. The storage room includes an insertion port for new containers with new or non-processed packed foods.

In a second aspect of the invention, the cyclic-moving means of the storage and delivery device comprises a guided passage and driving rollers. In the guided passage, a plurality of the shelf cases with square cross section is oriented in the same directions and is arranged in such a way that their sides are contiguously situated adjacent to each other to thereby form a square loop, from which one of the shelf cases is removed. The shelf cases are cyclically and movably guided. The driving rollers are arranged along the respective sides of the square loop to contact and press the outer surfaces of the shelf cases, and are rotated sequentially in a time-sequential manner, thereby moving the shelf cases cyclically.

In a third aspect of the invention, the square loop formed by the shelf cases includes two shelf cases on one side.

In a fourth aspect, the guided passage has a square loop-like guided channel as a guide, into which a pin provided at the center of the upper surface of the shelf case is inserted and along which the case is guided. The guided passage supports the shelf cases so that the shelf cases hang from the guided passage.

In a fifth aspect, the guided passage has a square loop-like guided channel as a guide, in which a pin provided at the center of the bottom plane of the shelf case is disposed and along which the case is guided. The guided passage supports the shelf cases with the containers.

In a sixth aspect, the guided passage may include a mechanism to prevent a reverse movement, thereby ensuring that the cyclic movement is in the right direction.

In a seventh aspect, the robot includes an arm; a pair of hand main bodies provided at the tip of the arm and arranged to linearly open and close; fingers coupled to the respective hand main bodies so that the fingers can turn around horizontal shafts common to the hand main bodies within the range between a horizontal position and a downward position; and position-maintaining means to maintain or cancel the horizontal position.

In an eighth aspect, the robot in the seventh aspect may include force-applying means to place the fingers in the horizontal position when the fingers do not grip the container with the packed food.

In a ninth aspect, the robot in the seventh or eighth aspect may further include a rotary damper to restrain the turning angular speed of the fingers.

In the storage and delivery device for packed foods disclosed in the first to ninth aspects, upon receiving a specific instruction or order, the robot opens the door of the storage shed and takes out the container with packed food from the shelf in the shelf case transferred cyclically by the cyclic-moving means. The container is transferred to the processing device, and after the container is processed by the processing device, the container is delivered to the delivery port. Containers with new packed foods are manually placed and housed on shelves of the shelf cases in the storage shed via the insertion port.

In the storage and delivery device of the second aspect, in particular, the shelf cases are supported by the guided passage and are cyclically moved in the same direction along the square loop. Moreover, the shelf cases located on the respective sides of the square loop are driven so that the shelf cases can be cyclically moved via the driving rollers rotated at sequentially delayed time intervals.

In the storage and delivery device of the third aspect, in particular, each side of the square loop formed by the shelf cases comprises two shelf cases, so that no space remains inside the loop.

In the storage and delivery device of the fourth aspect, in particular, the shelf cases are hung and supported by the passage, and are guided via the pins provided at the centers of the upper surfaces of the shelf cases and the square loop-like guided channel.

In the storage and delivery device of the fifth aspect, in particular, the shelf cases are loaded and supported on the passage and are guided via the pins provided at the centers of the bottom surfaces of the shelf cases and the square loop-like guided channel.

In the storage and delivery device of the sixth aspect, in particular, the mechanism for preventing the reverse movement, which is installed in the guided passage, restricts the direction of the cyclic movement.

In the storage and delivery device of the seventh aspect, in particular, the fingers of the hand are initially maintained in the horizontal position by the position-maintaining means, and after the door of the storage shed is pulled for opening, the fingers are inserted inside the storage shed to grip and take out the container of packed foods from the shelf case. The fingers are then released by the position-maintaining means from the horizontal position and are moved into the downward vertical position. Thereafter, the fingers place the container into the processing device while maintaining the downward vertical position, and after processing is finished, the fingers transfer the container with the packed food to the delivery port where the container is released.

In the storage and delivery device of the eighth aspect, in particular, the fingers are located at the horizontal position by the force-applying means when the fingers do not grip the container with packed food.

In the storage and delivery device of the ninth aspect, in particular, when the fingers turn from the horizontal position to the downward vertical position while gripping the container with packed food, the turning angular speed is controlled by the rotary damper. Such control reduces the impact when the fingers stop in the downward vertical position.

BRIEF DESCRIPTION OF THE DRAWINGS

FIG. 1 is a perspective view of the embodiment of the present invention;

FIG. 4 is a plan view of a guided passage in the embodiment;

FIGS. 5(a) to 5(d) are plan views illustrating the cyclic movement of the shelf cases of the embodiment;

DETAILED DESCRIPTION OF THE PREFERRED EMBODIMENTS

Figure 2:
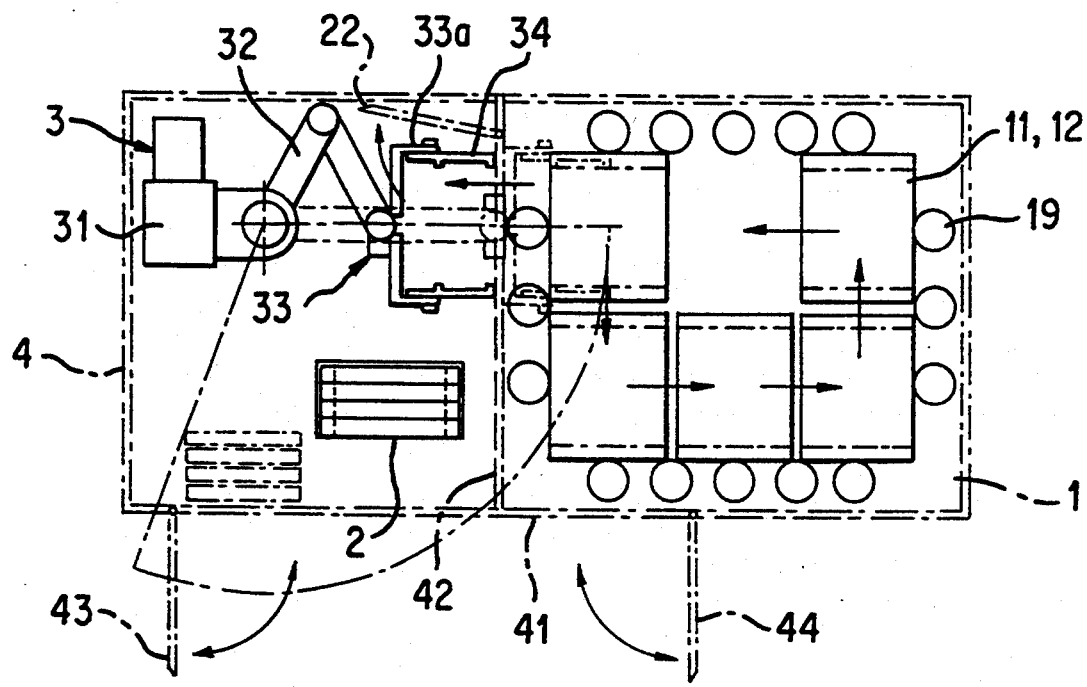
FIG. 2 is a plan view of the embodiment.

The embodiment of the storage and delivery device for packed foods of the invention is described with reference to the drawings. FIG. 1 is a perspective view of the embodiment. In this figure, the embodiment is basically formed of shelf cases for retaining packed foods, a storage shed 1 for housing the shelf cases 11 and having a mechanism for cyclically moving the shelf cases 11 while maintaining refrigeration, a boiler 2 or a processing device for defrosting or boiling the refrigerated packed foods, a robot 3 serving as transfer means for the packed foods, and a storage room 4 for storing all these components.

In FIG. 1, the storage room 4 has square peripheral walls 41 as a basic structure, and the inside of the room 4 is divided by a partition 42 with an inside door 22 into right and left chambers. The right chamber is used as a storage shed 1, while the left chamber is used as a storage space for the boiler 2 and the robot 3. An insertion door 44 corresponding to an insertion port for the packed foods contained in baskets or containers described below in detail is provided in the front of the storage shed 1 defined by the peripheral wall 41, while a delivery port 43 corresponding to the delivery port for the packed foods contained in the baskets is provided in the left front part of the peripheral wall 41.

The square shelf cases 11 in total five are stored inside the storage shed 1 in a vertically oriented array. Each shelf case 11 is movably hung and supported by a horizontal passage board 15 via an upper board 12 joined by a roller shaft 14. The shelf cases 11 are rotated by a motor 20, and are cyclically moved by driving rollers 19 that contact and press the outer surfaces of the upper boards 12 along a square loop-like guide channel into which the roller shafts 14 are inserted, as described below in detail.

FIG. 2 is a plan view of the embodiment. The delivery door 43 and the insertion door 44 are provided on the peripheral wall 41 of the storage shed 1 to be opened and closed around hinges (not identified) within a range of 90° as indicated by arrows. The five shelf cases 11 are situated in a way that one case is taken out from the six cases arranged such that the sides are contiguously located adjacent to each other to form a square loop. Removing one of the cases allows the rest of the cases to move cyclically as a whole in the direction of the arrow, that is, counterclockwise direction. The cyclic movement is achieved by rotating at different times the driving rollers 19 installed on the respective sides of the square loop, which contact the upper boards 12 corresponding to the shelf cases 11. This is described in detail below.

The robot 3 is a horizontal joint type robot, and is formed of a main body 31, a plurality of arms 32 rotatably joined together via joints and connected to the main body 31, a gripping hand 33 fixed to the final stage of the arm 32 through a wrist and having a pair of hand main bodies 33a, and fingers 34 joined with the hand main bodies 33a and capable of opening and closing linearly. The middle door 22 formed in the partition 42 via a hinge is opened by the hand 33 of the robot 3 when the hand 33 operates to take out the basket containing foods from the shelf case 11 in the storage shed 1 and to transfer the basket to the boiler 2, as explained below.

A maximum of four baskets (not identified) can be inserted into the boiler 2 at one time. After being boiled, the baskets are transferred by the robot 3 to the inside of the delivery door 43 of the storage room 4 to await manual delivery. The containers with new foods are placed and housed on the shelves in the shelf case 11 through the insertion door 44 manually opened.

Figure 3:
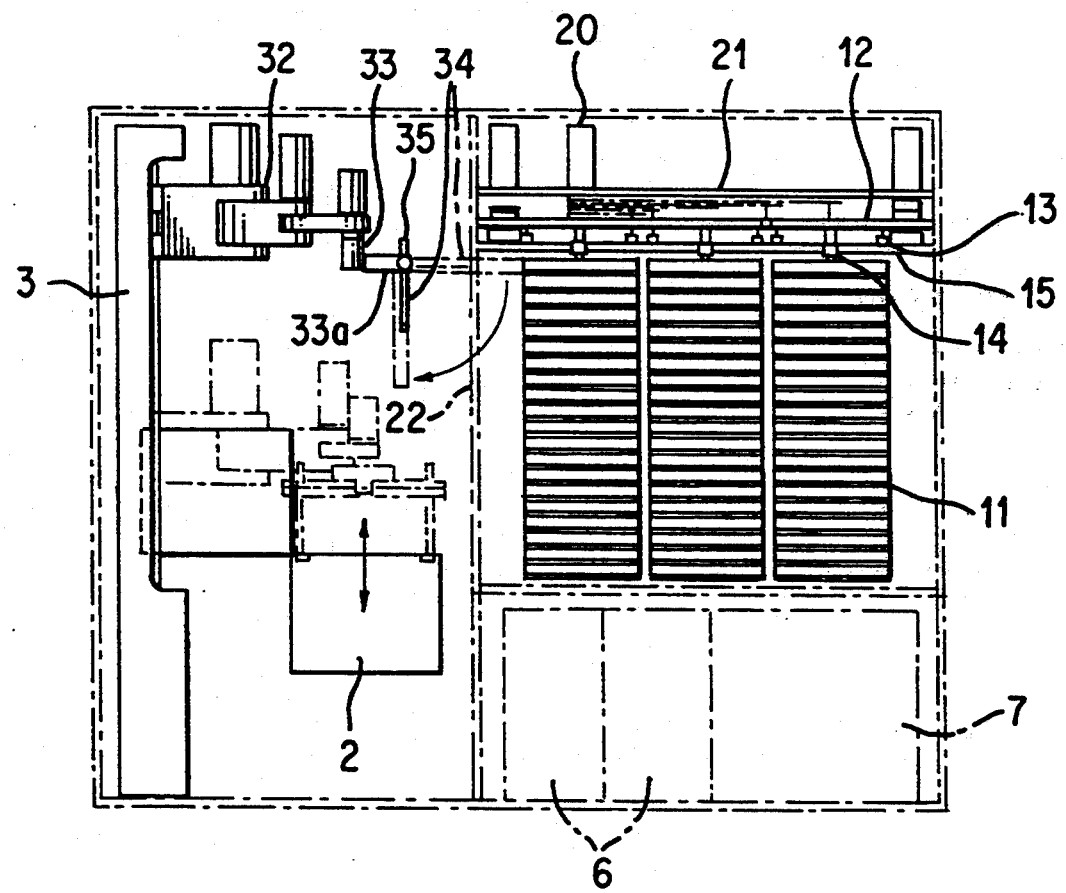
FIG. 3 is a side view of the embodiment.

FIG. 3 is a side view of the embodiment. Control parts 6 for the robot and the boiler, and a refrigeration part 7 are installed in the lower part of the right chamber. The control parts 6, upon receiving the instruction or order, actuate the robot and the boiler to deliver the food to the inside of the delivery door 43.

Each upper board 12 is joined to the corresponding shelf case 11 via the roller shaft 14, and includes ball casters 13 for allowing the board 12 to hang and support the shelf case 11 and to roll on the passage board 15. The driving rollers 19 (see FIG. 1) that contact and press the outer surfaces of the respective upper boards 12 corresponding to the shelf cases 11 receive power of a motor 20 transmitted through a belt, and transfer the shelf cases 11.

A pair of hand main bodies 33a of the hand 33 is provided at the tip of the arm 32 of the robot 3, and is designed to open and close linearly in the direction perpendicular to a sheet of FIG. 3. The main bodies 33a are joined with the fingers 34 indicated by the dashed lines so that the fingers 34 can turn around the shafts 35. After taking the basket from the shelf while maintaining the horizontal position, the fingers 34 are turned in the clockwise direction to orient in a downward vertical position. Then, the basket is inserted into the boiler 2. The operation of the hand main bodies 33a and the fingers 34 is described later in detail.

The cyclic movement of the shelf cases 11 is described with reference to FIGS. 4 and 5(a)–5(d). FIG. 4 is a plan view of the guided passage, and FIGS. 5(a)–5(d) are plan views illustrating the respective conditions in the cyclic movement of the shelf cases.

In FIG. 4, five shelf cases 11 located under the passage board 15 in this figure are hung and supported by the ball casters 13 situated above the upper surface (as viewed from the figure) of the passage board 15 so that the cases 11 can move. That is, each shelf case 11 is joined with the upper board 12 (indicated by the dashed line) with the same square form located above the passage board 15, and the ball casters 13 are provided at the four corners of the upper board 12 to roll on the upper surface of the passage board 15 (see FIG. 3). A guide 16 in the form of a square loop-like guide channel is formed in the passage board 15, and the roller shafts 14 are situated in the guide 16 to be cyclically guided along the square loop. The inner square part of the passage board 15 separated by the guide 16 is supported by hanging bars 15' hanging from the ceiling.

Reverse-movement prevention mechanisms 17 are provided in the four corners of the guide 16 to prevent the roller shafts 14 from moving in the clockwise direction. Each reverse-movement prevention mechanism 17 includes a cam with an obliquely sharp tip that closes the corner part of the guide 16 under a spring force to allow the roller shafts 14 to move only in the counterclockwise direction while preventing the shafts to move in the opposite direction. Therefore, the shelf cases 11 are controlled to move in the counterclockwise direction, that is, in the normal direction.

Narrow bridge boards 18a are located at four sites of the guide 16, while wide bridge boards 18b are located at two sites of the same guide. Each of the bridge boards 18a, 18b is rotatably supported at one end thereof to be positioned by a spring as illustrated, so that the roller shaft 14 passes by turning only within a range of 90°, and after the roller shaft 14 has passed, each of the boards 18a, 18b returns to the state as illustrated. The bridge boards literally act as bridges for the casters 13 so that the ball casters 13 can travel across the guide 16. The bridge board 18a is narrow since one ball caster 13 passes vertically as shown in FIG. 4, and the bridge board 18b is wide since two ball casters 13 pass horizontally. Further, the bridge boards 18a, 18b are formed by carving parts of the surface of the passage board 15 in such a way that the bridge boards are flush with the passage board in order to allow the ball casters 13 to roll smoothly.

Next, the cyclic movement of the shelf cases 11 is described. In FIG. 5(a), only five driving rollers 19 located on the upper side of the square passage board 15 rotate in the clockwise direction, so that the two shelf cases 11 located on the top part move to the left to create an empty space in the upper right corner. The robot starts to remove containers from the shelf case 11 located at the upper left corner (see FIG. 2).

Then, in order to move one shelf case 11 in the counterclockwise direction, only the three driving rollers located on the right side rotate in the clockwise direction to move the shelf case 11 located at the lower right corner in FIG. 5(a) to the upper right corner, which is empty, as shown in FIG. 5(b). Similarly, the five driving rollers located at the bottom side rotate in the clockwise direction as shown in FIG. 5(c), and the three driving rollers located at the left side rotate in the clockwise direction as shown in FIG. 5(d), to thereby allow a total of five shelf cases 11 to be cyclically moved. When the shelf cases 11 are arranged in a square loop, a space generally remains inside the loop, but in case one side of the square loop is formed of two shelf cases, no space remains inside the loop, which improves efficiency of the space.

Figure 11:
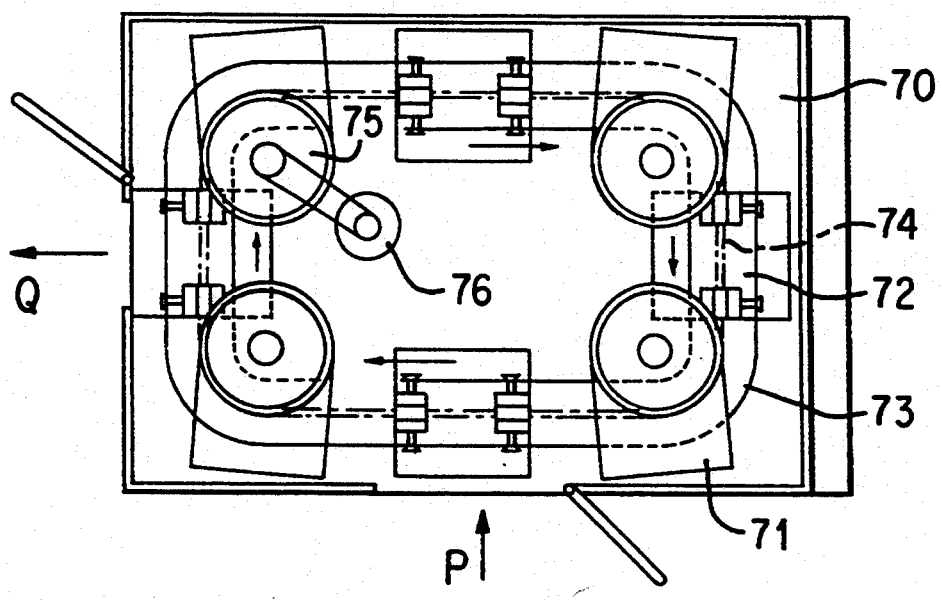
FIG. 11 is a plan view of cyclic-moving shelf cases in a conventional example.
Figure 12:
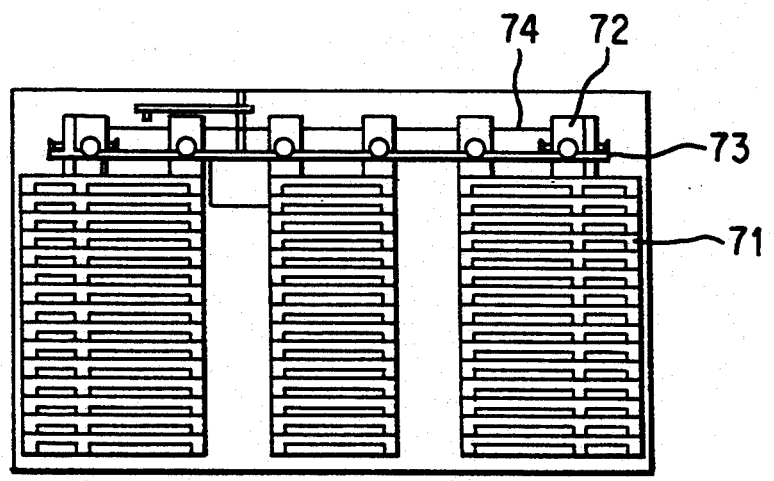
FIG. 12 is a side view of the conventional example in FIG. 11.

The efficiency of the shelf cases of the invention is illustrated while comparing with a conventional example. FIG. 11 shows a plan view of cyclic-moving shelf cases in a conventional example, and FIG. 12 is a side view thereof.

In these figures, eight shelf cases 71 are cyclically moved inside a storage shed 70. Eight travelling decks 72 are located along a square guide rail with four round corners, and are joined via a chain 74. The shelf cases 71 are fitted to and hung from the travelling deck 72. The chain 74 passes around sprockets 75 located at the four corners, and the power of a motor 76 is transmitted to the chain 74 to provide cyclic movement. These figures clearly indicate that the space occupied by the shelf cases in the conventional example is inefficiently used since idle space remains inside the square loop. In FIG. 11, the containers with packed foods are inserted into the shelf case 71 from a port indicated by arrow P, and are removed via a port indicated by arrow Q.

In the above embodiment, the shelf cases 11 hang from the passage board 15, but a passage board with a guide channel similar to the board 15 may be formed under the shelf cases 11. In this case, a board with ball casters is placed on or under the passage board to support the shelf case 11. The shelf cases 11 are guided by roller shafts engaging the guide channel of the board 15. The rest of the structure is exactly the same as in the above embodiment.

Figure 6:
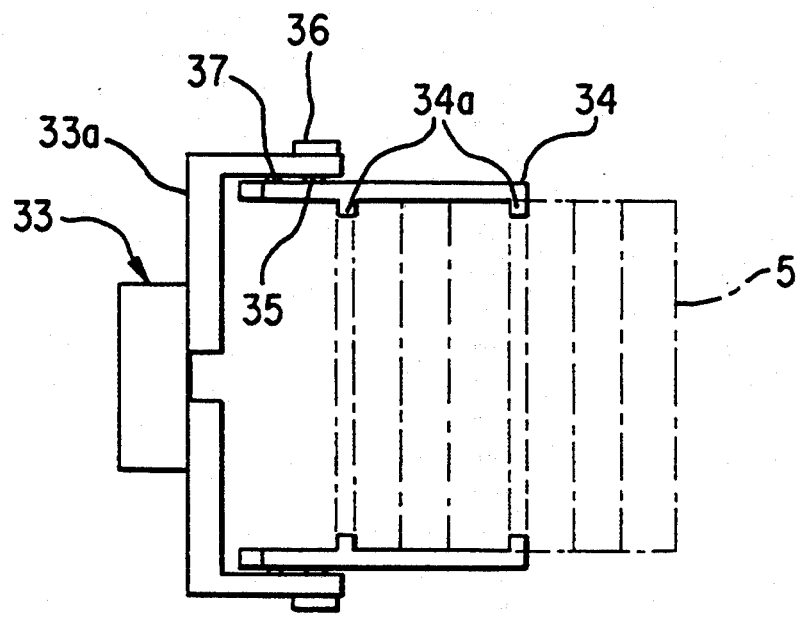
FIG. 6 is a plan view of a robot hand in the embodiment.

The robot, in particular, the hand for gripping the basket is described next. FIG. 6 is a plan view of the robot hand in the embodiment. In this figure, the hand 33 is formed of a pair of hand main bodies 33a and fingers 34. The pair of the hand main bodies 33a is provided at the tip (wrist part) of the arm so that the hand main bodies 33a are opposed to each other to open and close linearly. Each of the fingers 34 is provided at the end of the hand main body 33a around a shaft 35 so that the finger 34 can turn within a range of 90 degrees from the horizontal position to the downward vertical position.

Each finger 34 includes a rotary damper 36 coaxially fixed to the shaft 35 to provide torque resistance depending upon the rotating speed of the shaft 35 in order to control the speed. Ball plungers 37 are provided at two portions between the finger 34 and the hand main body 33a as a device to maintain the position (see FIG. 7), so that the horizontal position can be maintained upto the predetermined torque. In other words, the fingers can maintain the horizontal position when the fingers are not gripping the basket containing packed foods 5, although the fingers 34 can not maintain the horizontal position while gripping the basket 5.

Each finger 34 includes protruding parts 34a at an inner side, which are inserted into the basket 5 to ensure gripping, as described below in detail. A solenoid can be used as means to maintain the position instead of the ball plungers 37 for maintaining or cancelling the horizontal position of the fingers 34 by turning the current on and off. When the fingers 34 turn from the horizontal position to the downward vertical position while holding the basket 5 containing the packed food, the rotary damper 36 serves to reduce impact during the turning and the final stage of the turning. When the fingers 34 are not gripping the basket containing packed food 5, the fingers 34 are constantly subjected to force of torsion springs (not shown) or unbalance weight, which causes the fingers to return to the horizontal position. Thus, it is unnecessary to have position-maintaining operation for the fingers 34.

Figure 7:
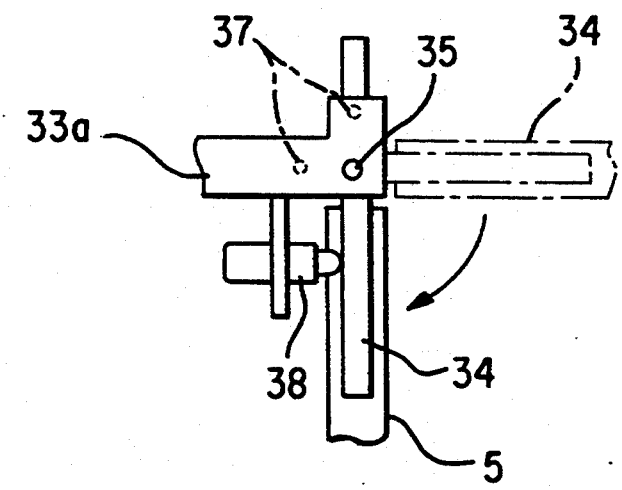
FIG. 7 is a side view of a modified robot hand.

A modified example of the robot hand is described with reference to FIG. 7, which is a side view of the modified example. In this example, a linear damper 38 is used in addition to the rotary damper 36 to allow the fingers 34 to collide against the linear damper 38 in the final stage to thereby reduce the impact when the fingers 34 turn from the horizontal position indicated by the dashed line to the downward vertical position indicated by the solid line. Other members are the same as in FIG. 6 and therefore, have the same numbers. Since the hands in FIGS. 6 and 7 perform a natural turning operation from the horizontal position to the downward vertical position by using the weight and load, the hands have a simpler structure than the conventional method of slowly turning the fingers by using an actuator. In addition, any impact during turning and the final stage thereof is reduced by the dampers 36, 38.

Figure 8:
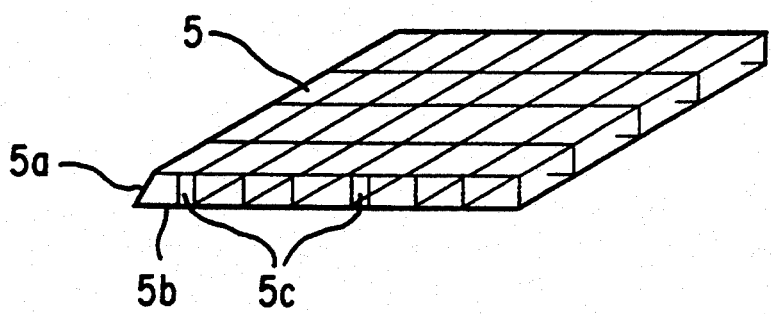
FIG. 8 is a perspective view of a basket in the embodiment.

The basket 5 for the packed food is next described with reference to the perspective view in FIG. 8 and the partial detailed view in FIG. 9. FIG. 8 shows that the basket 5 is of a screen structure formed in a square shape, and that insertion parts 5c with a distance corresponding to the width of the protruding parts 34a (see FIG. 6) of the finger 34 are provided at two portions on both sides of the basket 5, while a door 5a and a locking part 5b are provided in the left and lower left portions of the basket 5.

Figure 9:
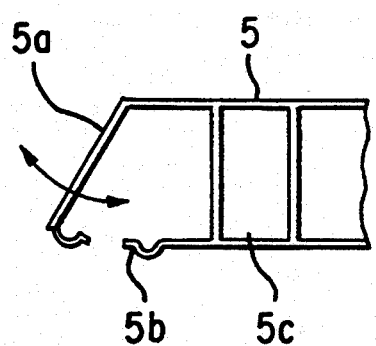
FIG. 9 is a partial detailed view of the basket.

FIG. 9 shows the door 5a, the locking part 5b and the insertion part 5c in detail. The door 5a can be opened and closed around a hinge at the top, and when closed, it is engaged with or locked by the locking part 5b. The insertion part 5c is merely a hollow part partitioned by two vertical wires, and the protruding part 34a (see FIG. 6) of the finger 34 is inserted into the insertion part 5c for gripping. Moreover, the basket 5 is made lighter because of the screen structure, which makes it easier to boil the packed foods.

Now, the delivery operation of the robot is described in order. First, the robot starts to operate upon receiving an order from the control part 6. The robot opens the door of the storage shed to transfer the basket 5 from the shelf case 11.

Figure 10:
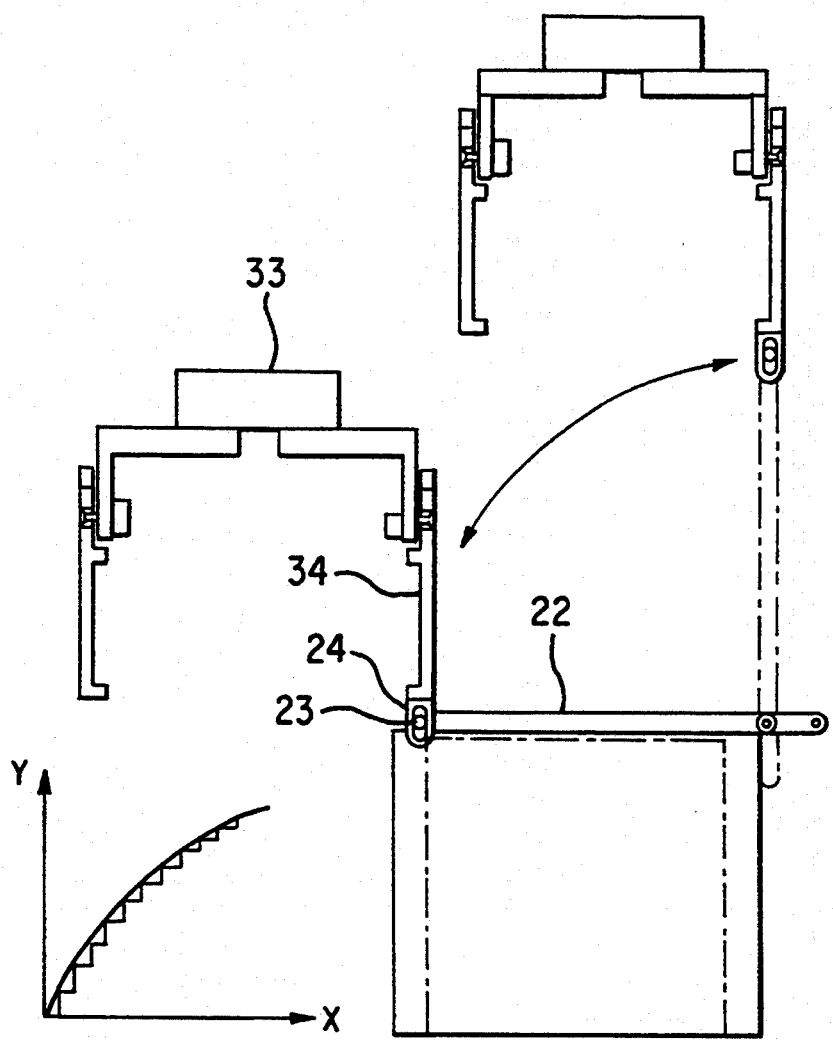
FIG. 10 is a plan view illustrating a storage shed door-opening operation conducted by the robot hand.

The storage shed door-opening operation of the robot hand is described with reference to FIG. 10, which is a plan view for illustrating the operation. In this figure, the inside door 22 is opened and closed within the range indicated by the two-dot chain line and the solid line. To achieve the opening and closing operation, a pin 23 is provided at the left side of the inside door 22, and a supplementary equipment 24 with a long hole to which the pin 23 is fitted is added to the tip of the finger 34 of the hand 33.

Although the hand 33 should be moved along a quarter arc to open and close the inside door 22, it is difficult to achieve the movement, and in fact, the hand 33 is moved along small zigzags in the X and Y directions so that the general movement forms an arc, as shown by the rectangular coordinates X and Y. In the supplementary equipment 24, the long hole is provided to compensate for the inconvenience of the hand movement caused by the difference between the arc and the zigzag track, and in this sense, the long hole is disposed in the lateral direction.

Instead of using the supplementary equipment 24 with the long hole, a tension spring (not shown) can be installed between the left side of the inside door 22 and the tip of the finger 34. A force in the closing direction can be applied by the torsion spring to the inside door 22 in advance, and the door 22 can be locked in the opening position. Accordingly, if a small force in the closing direction is applied to the door 22 by the supplementary equipment 24, the inside door 22 is closed.

As shown in FIG. 3, when the inside door 22 is opened, the fingers 34 maintained in the horizontal position are inserted into the shelf of the shelf case based on an instruction to grip and remove the basket containing the packed food. Once the basket is removed from the shelf case 11, the weight of the basket causes the fingers 34 to turn in the downward vertical position, and then the fingers 34 are horizontally turned by the arm 32. Then, the basket is inserted into the boiler 2 and the fingers 34 are released.

After releasing the basket, the fingers 34 are slightly inclined from the vertical position upon contacting an appropriate portion by moving the arm, so that the position-maintaining operation conducted by one of the ball plungers 37 (see FIG. 6) located in the vertical direction is cancelled. The fingers 34 then naturally move into the horizontal position as a result of the applied force, and then the other ball plunger 37 located in the horizontal direction maintains this position to allow the next basket to be removed. As shown in FIG. 2, a maximum of four baskets can be inserted into the boiler 2, and the above operation can be repeated as required.

When the last basket is inserted into the boiler 2, the fingers 34 are kept in the vertical position. Once the food has been defrosted or boiled, the baskets are sequentially gripped and raised by the fingers 34 maintained in the downward vertical position and are transferred to the front portion of the delivery door, from which the baskets are manually transferred.

In the storage and delivery device of the first aspect, after receiving an instruction, the robot opens the door of the storage shed, and removes the basket or container retaining the packed food from the shelf in the shelf case transferred cyclically by the cyclic-moving means. The basket is transferred to the boiler, and after processing the food in the container by the boiler, the container is transferred to the delivery port by the robot. The containers with new packed foods are manually placed and housed on the shelf in the storage shed through the insertion port. Thus, the packed foods are put in the containers with a fixed form, which are then placed and housed on the shelves. Because of the structure, the robot can easily handle the containers, while reducing the time to remove and process the containers before delivery, and allowing the first-in and first-out principle.

In the second aspect, the shelf cases are supported by the guided passage and are constructed so that the cases can be cyclically moved in the same direction along the square loop. Meanwhile, the shelf cases located on one side of the square loop are driven so that the shelf cases can be cyclically moved via the driving rollers rotated sequentially at an interval. The storage space can be efficiently used.

In the third aspect, the square loop formed by the shelf cases is formed of two shelf cases on one side, so that there is no space inside the square loop. This structure further enhances storage-space efficiency.

In the fourth aspect, the shelf cases are supported by the guide board and are guided through the square guide channel by the pin provided at the center of the upper surface of the shelf case. In the fifth aspect, the shelf cases may be supported on the guide board and guided through the guide channel by the pin provided at the center of the lower portion of the shelf case. Therefore, various hanging and loading methods can be freely selected for the shelf cases, allowing the device to be designed in a wide variety of ways.

In the sixth aspect, the reverse-movement prevention mechanism installed in the guide restricts the direction the cyclic movement of the shelf cases. This structure makes the cyclic movement smooth and reduces the delivery time.

In the seventh aspect, the fingers of the hand are initially maintained in the horizontal position by the position-maintaining means, and after the door of the storage shed is pulled and opened, the fingers are inserted inside the storage shed to grip and remove the container retaining the packed food from the shelf. The fingers are then released by the position-maintaining means from the horizontal position, and are turned into the downward vertical position. Then, the container is inserted into the processing device while maintaining the downward vertical position, and after the processing is completed, the container is transferred to the delivery port where the containers are released. Such a structure reduces the size of the robot, simplifies the structure, and reduces costs.

In the eighth aspect, the fingers are forced by the force-applying means to take the horizontal position when the fingers are not gripping the container containing the packed foods. Such a structure simplifies the robot control and reduces costs and delivery time.

In the ninth aspect, when the fingers turn from the horizontal position to the downward vertical position while gripping the container with the packed food, the turning angular speed is controlled by the rotary damper. Such a structure reduces the impact when the fingers stop in the downward vertical position. Therefore, the packed food is not damaged, and quality of the food is maintained. Also, the actuators with high output torque at the hand part need not be provided because gravity can be used to control the position of the hand. Consequently, the robot can be small and simple, while improving reliability.

While the invention has been explained with reference to the specific embodiments of the invention, the explanation is illustrative, and the invention is limited only by the appended claims.

What is claimed is:

1. A storage and delivery device for packed foods retained in containers, comprising:
   a plurality of shelf cases each having a plurality of horizontal shelves vertically spaced apart from each other, said containers with the foods being placed and housed on the shelves,
   a storage shed for retaining the shelf cases therein and having cyclic-moving means for cyclically moving the shelf cases horizontally arranged in the storage shed along a horizontal closed loop,
   heating means situated adjacent to the storage shed for heating the packed foods in the containers,
   a robot situated adjacent to the storage shed and the heating means, said robot being controlled, upon receiving an order, for taking out a container with a packed food from a selected shelf in the shelf cases, and transferring the container to the heating means for heating the packed food, said robot, after the packed food is heated, being controlled for picking up the container in the heating means and delivering to a delivery port, and
   a storage room for retaining the storage shed, the heating means and the robot, said storage room having the delivery port for delivering the containers with heated packed foods and an insertion port for inserting containers with new packed foods.

2. A storage and delivery device according to claim 1, wherein each shelf case has a square shape in plan, and the cyclic-moving means comprises a guided passage for arranging the plurality of shelf cases with the square shape to form a square loop, said shelf cases being arranged so that sides of the shelf cases are situated contiguously adjacent to each other, one of the shelf cases being removed from the square loop, and driving rollers situated along sides of the square loop to be rotated sequentially, said driving rollers contacting outer surfaces of the shelf cases to move the shelf cases cyclically along the square loop.

3. A storage and delivery device according to claim 2, wherein the square loop formed by the shelf cases has one side formed of two shelf cases.

4. A storage and delivery device according to claim 2, wherein said guided passage has a square loop-like guided channel, and each shelf case includes a pin provided at a center of an upper surface of the shelf case, said pin being inserted into the guided channel so that the case is guided along the guided channel, said guided passage supporting the cases hanging from the guided passage.

5. A storage and delivery device according to claim 2, wherein said guided passage includes a mechanism to prevent reverse movement of the shelf cases to ensure the cyclic movement in one direction.

6. A storage and delivery device according to claim 1, wherein said robot includes an arm, a pair of hand main bodies provided at a tip of the arm, said hand main bodies being operated to linearly open and close, fingers having horizontal shafts and joined to the respective hand main bodies through the horizontal shafts so that the fingers can turn around the horizontal shafts relative to the hand main bodies within a range between a horizontal position and a downward position, and position-maintaining means to maintain and cancel the horizontal position.

7. A storage and delivery device according to claim 6, wherein said robot further includes force-applying means for placing the fingers in the horizontal position when the fingers are not gripping the container.

8. A storage and delivery device according to claim 7, wherein said robot further includes a rotary damper for restraining turning angular speed of the fingers.

9. A storage and delivery device according to claim 1, wherein said storage shed includes a door for separating the shelf cases from the heating means and the robot, said robot opening the door before taking out the container from the shelf case.

* * * * *